United States Patent [19]
Horie et al.

[11] Patent Number: 5,690,881
[45] Date of Patent: Nov. 25, 1997

[54] MANUFACTURING METHOD OF RESIN DAMPER HAVING FOAMED RESIN SEAL MATERIAL

[75] Inventors: Takaaki Horie, Nagoya; Kazutoshi Higashi, Anjo, both of Japan

[73] Assignees: Nippondenso Co., Ltd.; Shimizu Industry Co., Ltd., both of Kariya, Japan

[21] Appl. No.: 242,099

[22] Filed: May 13, 1994

[51] Int. Cl.[6] .................................................. B29C 45/16
[52] U.S. Cl. .......................... 264/263; 156/305; 264/266; 264/328.12
[58] Field of Search .................... 264/328.12, 263, 264/266, 261; 156/305

[56] References Cited

U.S. PATENT DOCUMENTS 4,677,021  6/1987  Kayakabe et al. ............... 428/306.6
4,994,226  2/1991  Nakagawa et al. ................... 264/261
5,294,380  3/1994  Okamoto ........................ 264/328.12

*Primary Examiner*—Michele K. Yoder
*Attorney, Agent, or Firm*—Cushman, Darby & Cushman IP Group of Pillsbury Madison & Sutro LLP

[57] ABSTRACT

The present invention relates to a manufacturing method for a damper which is effective when used for a car air conditioner as a air flow switching door.

A resin damper body to which surfaces foaming resin seal materials are joined is formed by setting the foaming resin seal materials within mold spaces beforehand and then injecting the resin thereinto, and during which process the damper body and the seal materials are joined together. Particularly, the structure of the metal molds, the structure of an injection nozzle, and the shape of the seal materials are improved in order to improve the shape of the seal materials and the shape of the damper body during the injection molding.

4 Claims, 17 Drawing Sheets

5,690,881

MANUFACTURING METHOD OF RESIN DAMPER HAVING FOAMED RESIN SEAL MATERIAL

FIELD OF THE INVENTION

The present invention generally relates to a manufacturing method for a damper. More particularly, the present invention relates to a manufacturing method for a damper in which the damper body is molded with resin and cellular resin seal materials are laminated to the surfaces of the damper body.

The damper to be manufactured by the method according to the present invention is used for controlling air flow, and particularly effective when used for a car air conditioner to switch air outlets, to switch suction air from a recirculated mode or a fresh mode, or to be used as an air mixing door for controlling air volume which bypasses a heater core.

BACKGROUND OF THE INVENTION

As a method of integrally laminating a resin damper body and cellular resin seal materials, a technique has been disclosed in U.S. Pat. No. 4,994,226, for example.

In this, cellular resin seal material is set within a metal mold, these seal materials are compressed during mold clamping, and then in this state resin is injected into the mold. The resin injection is performed in two stages. In the first stage, the resin is injected at a comparatively low pressure, and the injected resin flows along the surfaces of the seal materials while pressing the seal materials. In the second stage, the resin is injected at a high pressure, and the injected resin pervasively fills the mold space. In this conventional method, the resin partly flows into the foaming portion (hollow parts) of the seal material, whereby the damper body and the seal material can strongly be joined.

The present invention is to improve this technique. In the present invention, though there is not always necessary to inject the resin at two stages with different pressures as stated in the above U.S. patent, cellular resin seal material is set beforehand within a mold, the resin is injected into the mold to form a damper body, and at the same time, to adhere the cellular resin seal materials to the surfaces of the damper body.

OBJECTS

In a first embodiment of the present invention which an air guide is projectingly formed on a damper body, an object is to provide sufficient strength to the air guide in manufacturing the damper body and the air guide integrally.

Also in the first embodiment of the present invention, another object is to prevent the seal materials from being excessively deformed around an air guide in manufacturing a damper and an air guide integrally.

Particularly, in the first embodiment of the present invention, a specific object is to prevent the air guide forming resin from flowing to the surfaces of the seal materials and degrading the performance of the seal material.

The second invention of the present embodiment relates to a manufacturing method for a damper which has a flat part and a bent portion formed by bending the flat part, and cellular resin seal material arranged on the surface of the bent portion of the damper.

In the second embodiment of the present invention, an object is to prevent the seal material laminated to the bend portion of the damper body from being unnecessarily drawn during the mold clamping to such an extent that the seal material can not be held in the prescribed position.

Accordingly, in the second embodiment of the present invention, a specific object is to ensure that the seal material can exactly be compressed during the mold clamping by improving the structure of the mold.

The third embodiment of the present invention, like the first embodiment, relates to a manufacturing method for a damper which projectingly forms an air guide on the damper body. In this third embodiment of the invention, it is an object to prevent the seal materials from being deformed around the air guide due to a rough resin flow towards the air guide by controlling the same resin flow.

In a fourth embodiment of the present invention, it is an object to sufficiently maintain the shape of the formed damper body when the mold is opened after the mold injection.

More particularly, the fourth embodiment of the present invention relates to a manufacturing method for a damper in which seal material is held to the damper body in a mold in the compressed state at the time the mold is opened. Accordingly, it is an object of the fourth embodiment of the invention to prevent the damper body from being deformed due to the restoring force of the seal material at the time the mold is opened.

The fifth embodiment of the present invention relates to a manufacturing method for a damper which has a shaft part for pivoting the damper body at one side of the damper body. More particularly, the fifth embodiment of the present invention relates to a manufacturing method for a damper in which the seal material is extendedly disposed up to a position adjacent to the shaft part.

In the fifth embodiment of the present invention, it is an object to allow the restored seal material to maintain a good shape after the mold is opened by arranging the seal material not to contact the shaft part within the molds during the damper forming.

The sixth embodiment of the present invention relates to a manufacturing method for a damper in which resin flows through the seal materials into mold space when the resin is injected into the molds.

Particularly, in the sixth embodiment of the present invention, it is a specific object to prevent the seal materials around an injection nozzle from being drawn by the injected resin as the injection nozzle is disposed to pass through the seal material. In other words, in the sixth invention of the present embodiment, it is an object to allow the seal material to exactly be held around the injection nozzle by reversing the resin flow injected from the injection nozzle.

In the seventh embodiment of the present invention, it is an object to exactly join the seal material to the damper body even if the resin composing the damper body is difficult to properly flow into the foam material of the seal material as the seal material is composed of foaming resin.

The present invention aims to achieve each object as described above, and each composition as described in each claim is employed.

In the first embodiment of the present invention, slits are formed in the prescribed position corresponding with the air guide in the seal material. In this arrangement, the resin within the mold space flows from the damper body part into the air guide part through these slits.

Particularly, by specifying the size of the slits, the resin flow from the damper body part into the air guide part through the seal material can be properly controlled so that the air guide has proper strength. Furthermore, in the first embodiment of the present invention, continuous parts of the seal material can be provided between the slits by prescribing the position of the slits. And due to these continuous parts of the seal material, the position of the seal material can exactly be maintained within the mold irrespective of the resin flow from the damper body part into the air guide part.

Also in the second embodiment of the present invention, a divided movable mold can be moved according to the bent shape of the damper body by dividing the movable mold. That is, in the second embodiment of the present invention, the first movable mold can shift in the direction at almost right angles to the direction of the seal material at a portion from the beginning of the bent part to an end of the damper body, and resultantly the seal material can exactly be compressed.

The second movable mold compresses the seal material to a fixed mold side while bending the seal material. In the second embodiment of the present invention, the second movable mold can shift in the direction corresponding with the direction in which the seal material is bent, and therefore, the second movable mold can properly compress the seal material.

As a result, according to the second embodiment of the present invention, the seal material can properly be compressed during the mold clamping while being bent. In other words, there is no possibility that the seal materials is deformed after the mold is opened by the restoring force thereof after being excessively drawn during the mold clamping.

In the third embodiment of the present invention, the resin flow within the metal mold can be properly controlled as the thickness of the air guide part of the metal mold is prescribed. That is, in comparison of the resin flow within the damper body part of the metal mold with the resin flow within the air guide part of the metal mold, excessive resin flow to the air guide part can properly be prevented. Therefore, such a defect that is caused by the overflow of the resin from the air guide part to the damper body part and the coverage of the seal material disposed on the damper body surface can properly be prevented.

In the fourth embodiment of the present invention, as the damper body forms holding parts in the metal mold (of the two metal molds) in which the damper body remains while compressing the seal material after the mold is opened, the damper body can be held throughout the metal mold in the proper position. Particularly, in the fourth embodiment of the present invention, as the damper body is held within the metal mold while compressing the foaming resin seal material, the damper body is easily deformed by the restoring force of the foaming resin. In the fourth embodiment of the present invention, however, the entire damper body can be held within the metal mold with the original shape remained unaffected by using the holding parts as described in the above. Therefore, even under the molding conditions with such large restoring force exerting on the damper body, the damper body is not deformed, assuring the manufacture of quality dampers.

In the fifth embodiment of the present invention, since a end shape of the seal material adjacent to the shaft part is tapered, there is no possibility that the seal material adhere to the shaft part. Furthermore, due to this arrangement, there is no possibility that the seal material is drawn to the shaft part side when the seal material adhere to the shaft part and deformed.

In the sixth embodiment of the present invention, the shape of the injection nozzle of the metal mold is improved so that the resin flowed from the injection nozzle into the mold space can be reversed. In the sixth embodiment of the present invention, due to this arrangement, the seal material around the injection nozzle is properly pressed against the metal mold by reversed resin flow, though the resin flows into the mold space through the seal materials. In other words, the seal material is not drawn along the mold surface by the resin injected from the injection nozzle, and, as a result, the seal material is properly pressed against the metal mold and the position thereof can be fixed.

In the seventh embodiment of the present invention, as filmy porous elastic material is disposed between the foaming resin seal material and the resin damper body, even if the foaming resin composing the seal material is vulnerable as material, the seal material can properly be joined to the damper body. That is, even if the foaming resin composing the seal material is low in hardness, even if the cells of the foaming resin are excessively large or small, even if the hardness of the foaming resin is excessively high or low, or even if the tearing strength of the foaming resin is not sufficient, the foaming resin and the resin damper body can properly be joined.

DETAILED DESCRIPTION OF THE EMBODIMENTS

Figure 1:
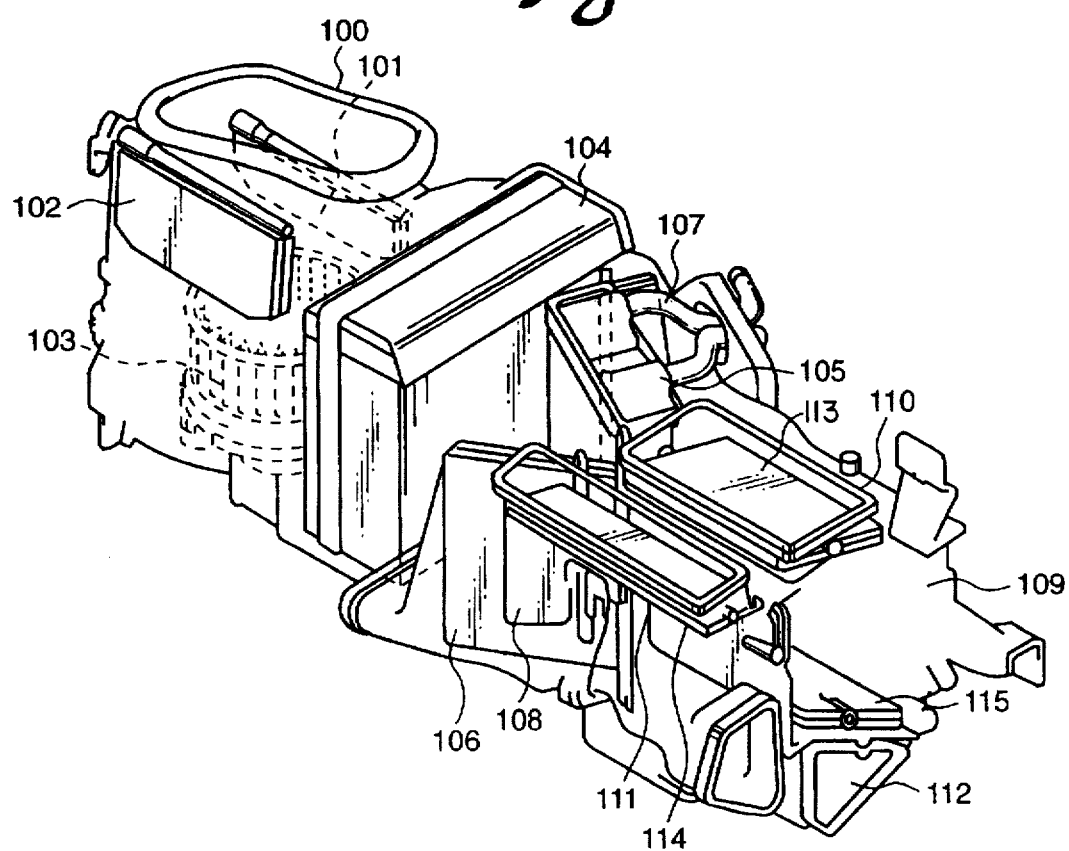
FIG. 1 is a perspective view illustrating an application example of a damper related to the present invention.

FIG. 1 illustrates an example of a damper related to the present invention. The damper manufactured according to the present invention can suitably be used for car air conditioners. In FIG. 1, fresh air and recirculated air switching part 100 switches an air flow to be introduced into a case between a fresh air and a recirculated air by means of a restitutive air switching doors 101 and 102.

The fresh air and recirculated air switching part 100 includes a blower 103. The air selectively introduced into the case by the air switching doors 101 and 102 flows through the case, and then blown into a car compartment by the blower 103. The case includes an evaporator 104 and a heater core 105 which is located downstream of the air flow. When passing through the evaporator 104, the air is cooled, and when passing through the heater core 105, the air is heated. Therefore, by varying the volume of the air passing through the heater core 105, the temperature of the air to be blown into the car compartment can be varied.

The volume of the air passing through the heater core 105 is controlled by air mixing doors 106 and 107. When the heater core 105 is in the closed state closed by the air mixing doors 106 and 107, the air cooled by the evaporator 104 is blown into the car compartment in the cooled state without being reheated. On the other hand, when the air is led into the heater core 105 by rotatively moving the air mixing doors 106 and 107, the air is heated by the heater core 105 and then blown into the car compartment.

A maximum cooling door 108 is provided to permit a large volume of the air in the cooled state with the air mixing doors 106 and 107 completely closed to maximize the air flow area within the case.

A blowout switching part 109 is provided with a defroster part 110 opened upwards and blows out warm air from the upper side to the windshield to defrost the windshield. Also arranged at the upper part of the blowout switching part 109 is an upward blowout 111 to blow the cold air to the head and chest of a driver and/or a passenger. At the lower part of the blowout switching part 109 is located a heater blowout 112 to blow the warm air to the feet of the driver and/or a passenger. The defroster part 110, the upward blowout 111 and the heater blowout 112 are controllably switched in relation to a defroster door 113, a center ventilator door 114 and a heater door 115 respectively.

Figure 2:
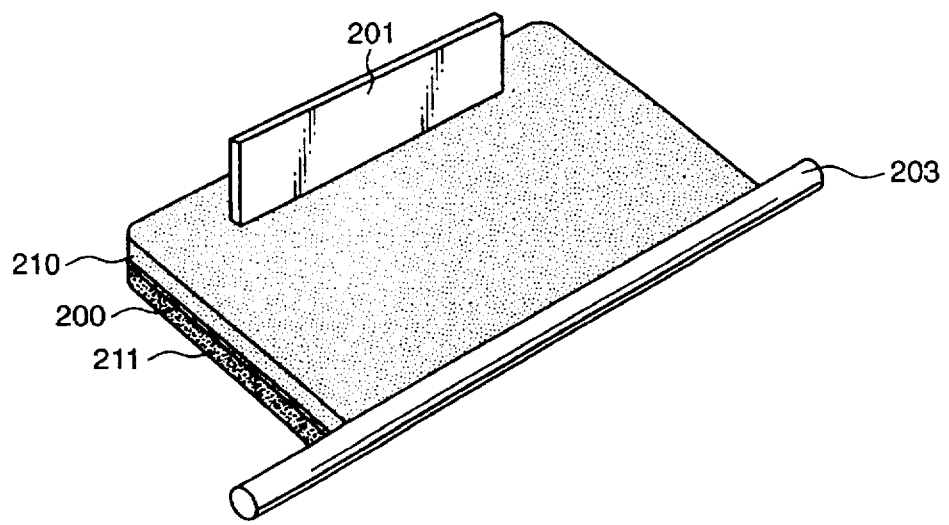
FIG. 2 a perspective view illustrating an example of the damper related to the present invention.

FIG. 2 is a perspective view illustrating an embodiment related to the first invention of the present invention, specifically a damper which can effectively be used as the air mixing door 106, for example. A resin damper body 200 switches the air flow, which is pivotally around a shaft part 203 integrally formed with the damper body at one end thereof. Nearby the other end of the damper body 200 is integrally and projectingly formed an air guide 201 to guide the air, whose flow direction has been switched by the damper body 200, in the desired direction.

At both the front and rear surfaces of the damper body 200 are formed foaming resin seal material 210 and 211.

Figure 3:
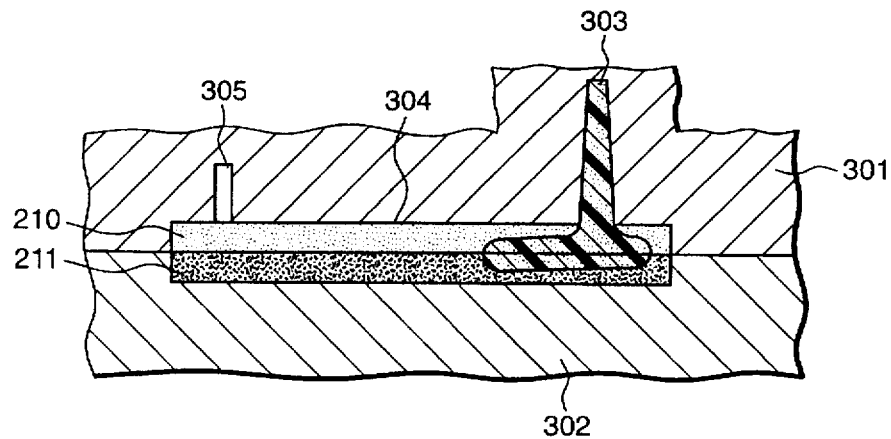
FIG. 3 is a cross-sectional view illustrating an molding example of the damper related to the present invention.
Figure 4:
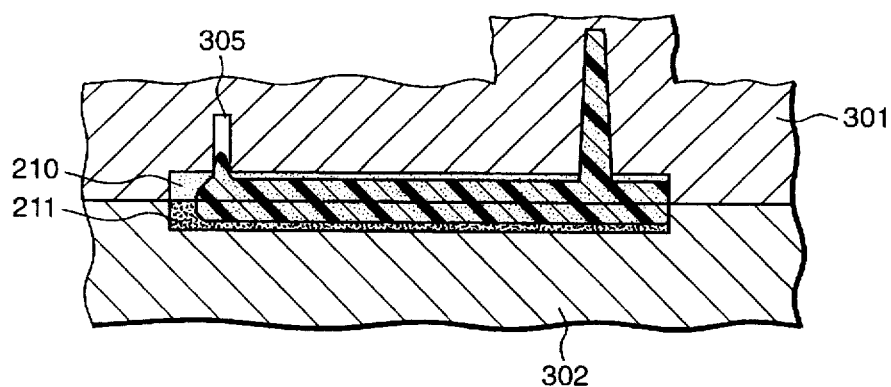
FIG. 4 is a cross-sectional view illustrating a molding example of the damper related to the present invention.
Figure 5:
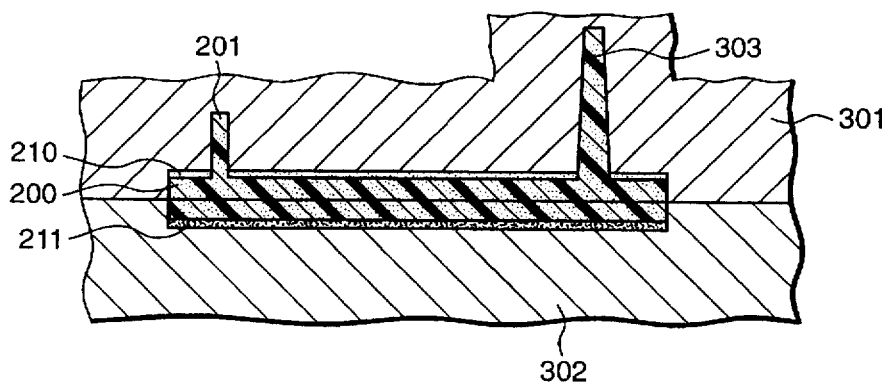
FIG. 5 is a cross-sectional view illustrating a molding example of the damper related to the present invention.

As illustrated in FIGS. 3, 4 and 5, this damper body 200 is manufactured by injecting the resin into metal molds. A movable metal mold 301 and a fixed metal mold 302 form mold spaces, among which a mold space 304 is prepared for molding the damper body 200 and a mold space 305 is prepared for forming an air guide 201. A portion 303 is an injection nozzle, through which the resin is injected into the mold space 304. As illustrated in FIGS. 3, 4 and 5, foaming resin seal materials 210 and 211 are set within the movable metal mold 301 and the fixed metal mold 302. The mold space 304 is formed and at the same time the seal materials 210 and 211 are compressed by clamping the movable metal mold 301 on the fixed metal mold 302.

As illustrated in FIG. 3, the resin injected from the injection nozzle 303 flows through the seal material 210, and then flows between the seal materials 210 and 211.

As illustrated in FIG. 4, the resin diffuses within the mold space 304, while pressing the seal materials 210 and 211. The resin flows through the seal material 210 disposed at the side where the air guide 201 is to be formed, and the resin partly flows into the mold space 305.

FIG. 5 illustrates the state in which the resin has completely filled the mold spaces 304 and 305, whereby the damper body 200 and the air guide 201 are formed.

Figure 6:
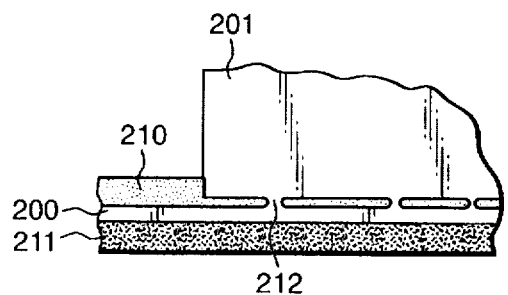
FIG. 6 is a cross-sectional view illustrating a seal material with no slit formed therein.
Figure 7:
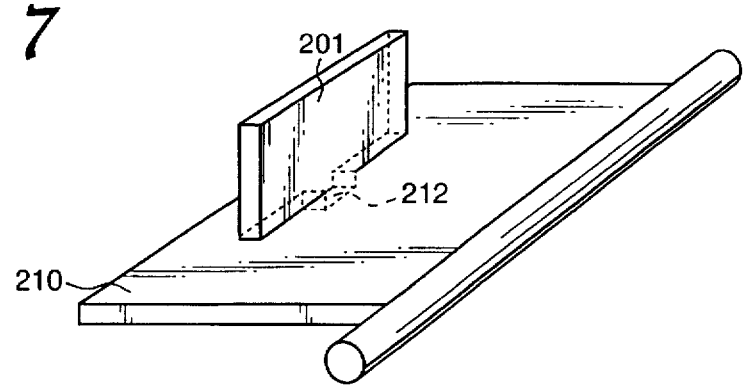
FIG. 7 is a perspective view illustrating the damper of FIG. 6.

In this embodiment, as described above, the resin injected into the mold space 304 penetrates the seal material 210 and flows into the mold space 305. In this arrangement, however, if no slit is formed in the seal material 210, the resin injected into the mold space 304 can not flow into the side of the mold space 305 formed for forming the air guide 201 unless a part of the seal material 210 is broken through. When the resin partly breaks through the seal material 210 and flows into the side of the mold space 305 for the air guide 201, the resin integrally joins the damper body 200 and the air guide 201 only through parts which the resin has partly broken through the seal material 210 as illustrated in FIG. 6.

However, the position in which the resin partly breaks through the seal material 210 (or continuous parts 212) may inconsistently vary according to the pressure and fluidity of the resin when the resin is injected, the tensile strength of the seal material 210, and other factors.

Particularly, in the air guide 201 projectingly formed with the resin which has partly broken through the seal material 210 as described above, the continuous parts 212 have only small connecting areas in many cases. As a result, the air guide 201 may not have sufficient strength.

Figure 8:
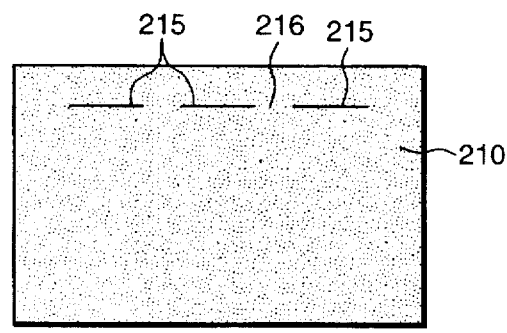
FIG. 8 is a front view illustrating a seal material with slits formed therein.
Figure 9:
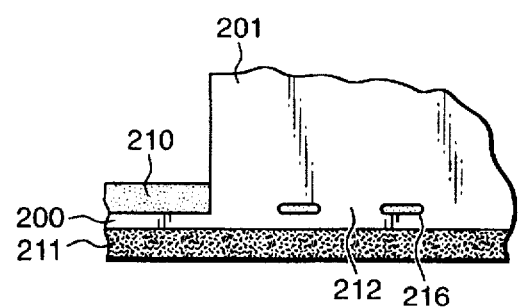
FIG. 9 is a cross-sectional view illustrating a damper with the seal material of FIG. 8.
Figure 10:
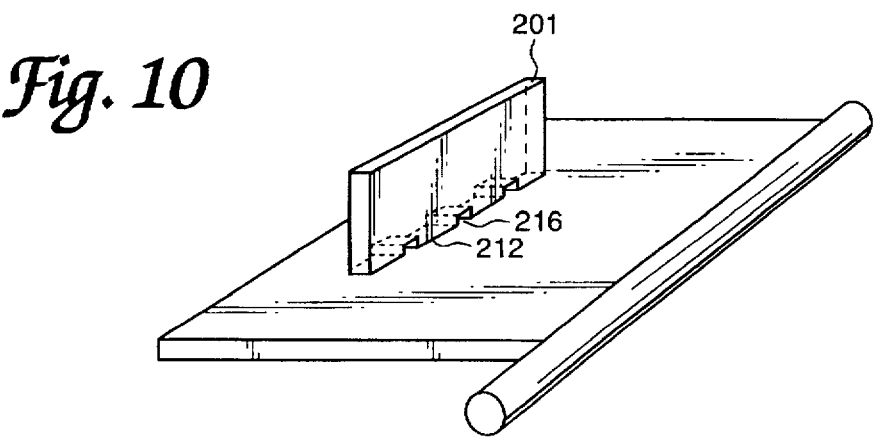
FIG. 10 is a perspective view illustrating the damper of FIG. 9.

To solve this problem, this embodiment has slits 215 formed beforehand in the position in which the air guide 201 is formed, as illustrated in FIG. 8, so that the injected resin can flow through these slits 215 into the side of the mold space 305 for forming the air guide 201. As a result, this embodiment ensures that the continuous parts 212 joining the air guide 201 and the damper body 200 are exactly formed in correspondence with the slits 215 formed beforehand. FIG. 9 is a cross-sectional view illustrating the continuous parts 212 formed in correspondence with the slits 215. FIG. 10 is a perspective view illustrating the air guide 201. As evident from FIGS. 9 and 10, this embodiment ensures that the continuous parts 212 are exactly formed, the continuous areas of the joining parts are sufficiently large, and the air guide 201 has sufficient joining strength.

This embodiment sets that the length of each slit 215 is approximately 10 mm and the length of each continuous part 216 of the seal body formed between the slits 215 is approximately 5 mm.

Figure 11:
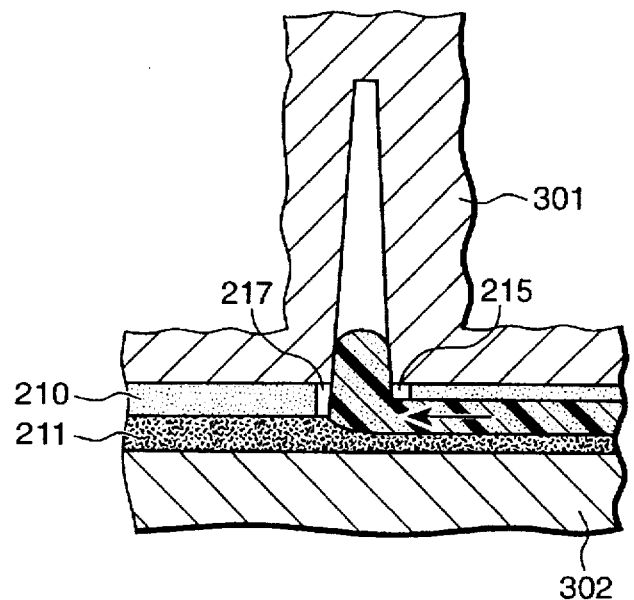
FIG. 11 is a cross-sectional view illustrating a molding example with excessively large slit area.
Figure 12:
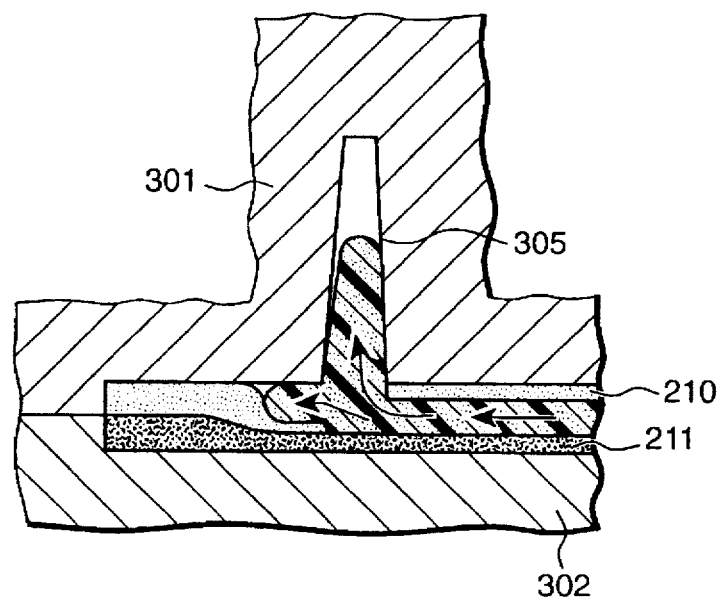
FIG. 12 is a cross-sectional view illustrating a molding example with excessively large slit area.

In this embodiment, the slits 215 are dividedly and plurally formed within the length corresponding with the overall length of the air guide 201 and the continuous parts 216 are formed between the slits 215, instead of continuously being formed throughout the same length, for the following reason:

As illustrated in FIG. 11, if the slit 215 is continuously formed throughout the length corresponding with the overall length of the air guide 201, a slit opening 217 of the seal material 210 may be excessively widened by the injection pressure. FIG. 11 illustrates that an end surface of the slit opening 217 is excessively spread by the injection pressure in the direction indicated by an arrow. If the resin flows into the slit opening 217 in this state, the resin will partly flow between the seal material 210 and the metal mold 301 as illustrated in FIG. 12.

As illustrated in FIGS. 4 and 5, the resin should flow into between the seal materials 210 and 211. Therefore, if the resin flows between the seal material 210 and the metal mold 301 as illustrated in FIG. 12, the sealing function of the seal material 210 will be impaired, causing a defect to the damper.

By forming the continuous parts 216 as illustrated in FIG. 8, the slits 215 will not be excessively widened, and no such problem as described above will be caused.

As per above description, the excessively large length of the slits 215 will cause a defect to the damper. On the other hand, if the length of each slit 215 is excessively small, the joint areas of the continuous parts 212 between the damper body 200 and the air guide 201 will be so small that the strength of the air guide 201 will be impaired. To counter this problem, this embodiment sets the length of each slit 215 both not to case a defect to the damper and to secure the sufficient strength of the air guide 201.

It should be noted, however, that a length of approximately 10 mm of each slit 215 and a length of approximately 5 mm of each continuous part 216 should be changed according to the injection conditions of the resin and the strength of the seal material 210 as described in the above, and should not be fixed to the above values.

Figure 13:
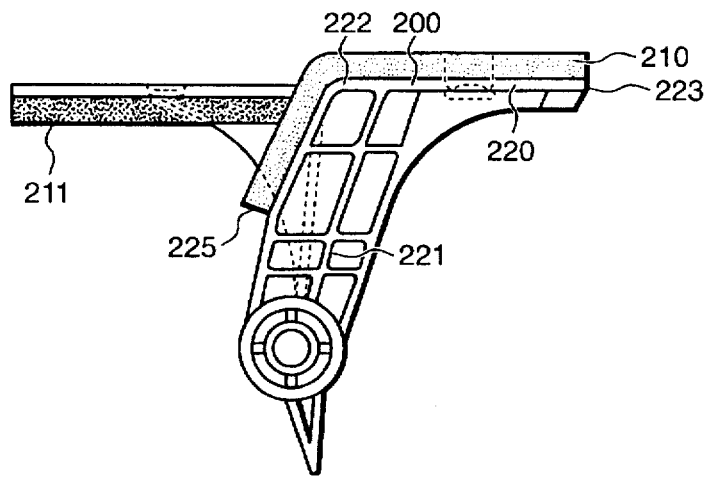
FIG. 13 is a front view illustrating a damper shape related to the present invention.
Figure 14:
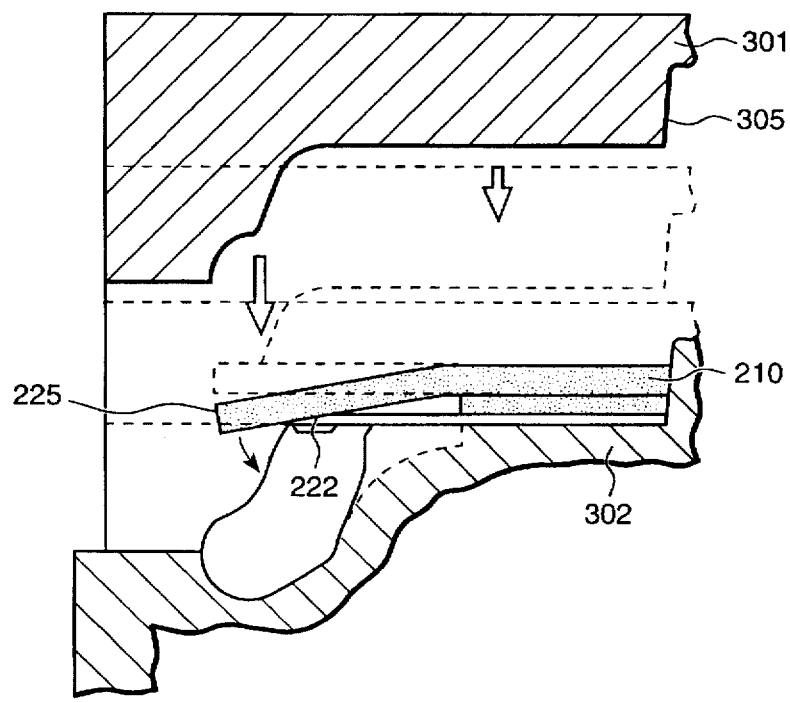
FIG. 14 is a cross-sectional view illustrating molds for molding the damper of FIG.

Now, another embodiment related to the second aspect of the present invention will be described. As illustrated in FIGS. 13 and 14, some dampers have a bent part 221. In this embodiment, the damper body 200 is divided into a flat plate part 220 and a bent supporting part 221 which is bent from the flat plate part 220. The seal material 210 extendedly exists at both the sides, a side of an end part of the damper body 200 and a side of the bent supporting part 221 with respect to a bending point 222 therebetween. Furthermore, in this embodiment, the seal material 210 is disposed on the surface which faces the surface forming the bent supporting part 221.

Consequently, when the damper body 200 is integrally formed by using two different movable metal molds, 301 and 302, the seal material 210 is pressed towards the supporting part 221 from the bending point 222 as illustrated in FIG. 14. As a result, depending on the mold clamping conditions, the seal material 210 may excessively be drawn by the movable metal mold 301, or when the contacting area between the movable metal mold 301 and the seal material 210 is small, only the seal material 210 may bent.

In other words, when the seal material 210 is bent by using only two metal molds 301 and 302, the seal material 210 may be displaced by the movable metal mold 301, resulting in the inconsistent position of the end surface 225 of the seal material 210.

Figure 15:
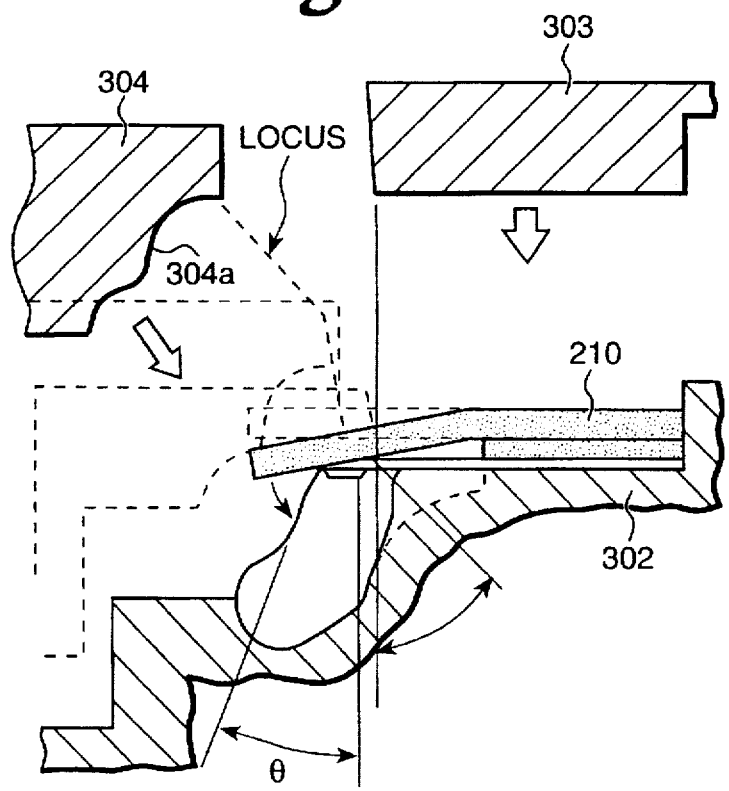
FIG. 15 is a cross-sectional view illustrating molds for molding the damper of FIG. 13 and an example related to the present invention.

In this embodiment, to counter the above problem, the movable metal mold is divided into a first movable metal mold 303 and a second movable metal mold 304 as illustrated in FIG. 15. The first movable metal mold 301 moves towards the fixed metal mold 302 in the direction almost perpendicular to the flat plate part 220 of the damper body 200 to press the seal material 210 at right angles thereto in the conventional way.

On the other hand, the second movable metal mold 304 moves towards the fixed metal mold 302 in the direction near the bending locus of the seal material 210. That is, when the seal material 210 bends at the bending angle, the second movable metal mold 304 shifts towards the fixed metal mold 302 in the posture slant at an angle of approximately ½ of the bending angle 8 of the seal material 210.

In this arrangement, as the moving locus of the second movable metal mold 304 corresponds with the bending locus of the seal material 210, the seal material 210 is not drawn by the metal mold 304 during the mold clamping. As a result, the exact positioning of the end surface 225 to the prescribed position can be achieved.

Particularly, as illustrated in FIG. 15, when an engagement part 304a is formed within the metal mold 304 in the position corresponding with the end surface 225, the positioning of the end surface 225 can be accomplished more exactly.

Then, an embodiment related to the third aspect of the present invention will be described. According to the aspect related to the third invention, the air guide 201 is projectingly formed on the damper body 200 in the same way as the above first embodiment.

Figure 16:
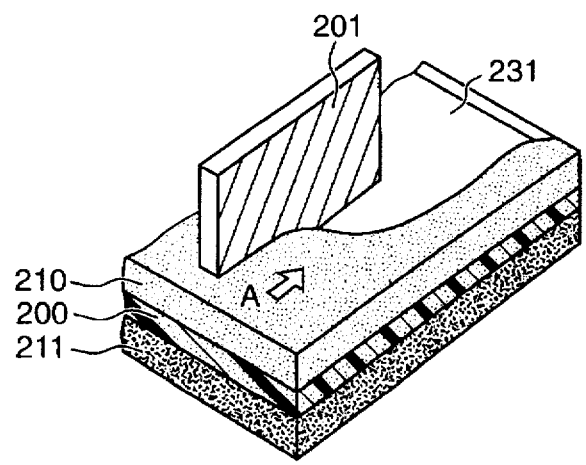
FIG. 16 is a perspective view of a molding example of a damper provided with an air guide.

Particularly, as illustrated in FIG. 16, when the injected resin flows within the mold space 305 along the air guide 201 (as indicated by an arrow A), it is recognized that the resin flowed into the mold space 305 at the side of the air guide 201 overflows to the surface side of the seal material 210 in the same way as illustrated in FIG. 12. In FIG. 16, the numeral 231 refers to the overflow of the resin, which is caused to flow to the surface of the seal material 210.

Figure 17:
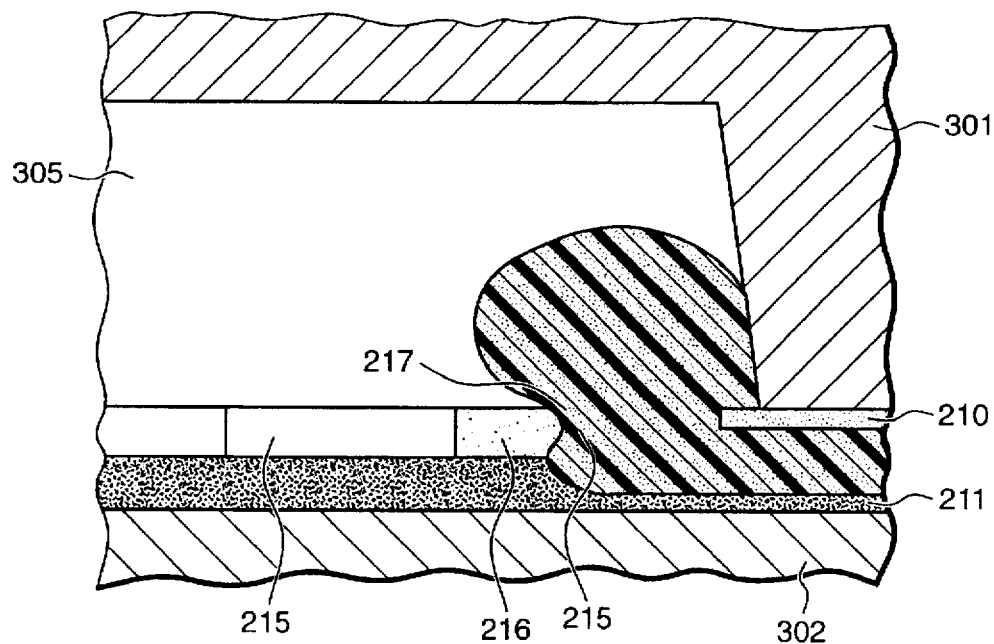
FIG. 17 is a cross-sectional view illustrating the molding condition of the damper of FIG. 16.

The overflow part 231 was analyzed for the cause of overflow. The results of the analysis will now be described with reference to FIGS. 17 and 18.

Figure 18:
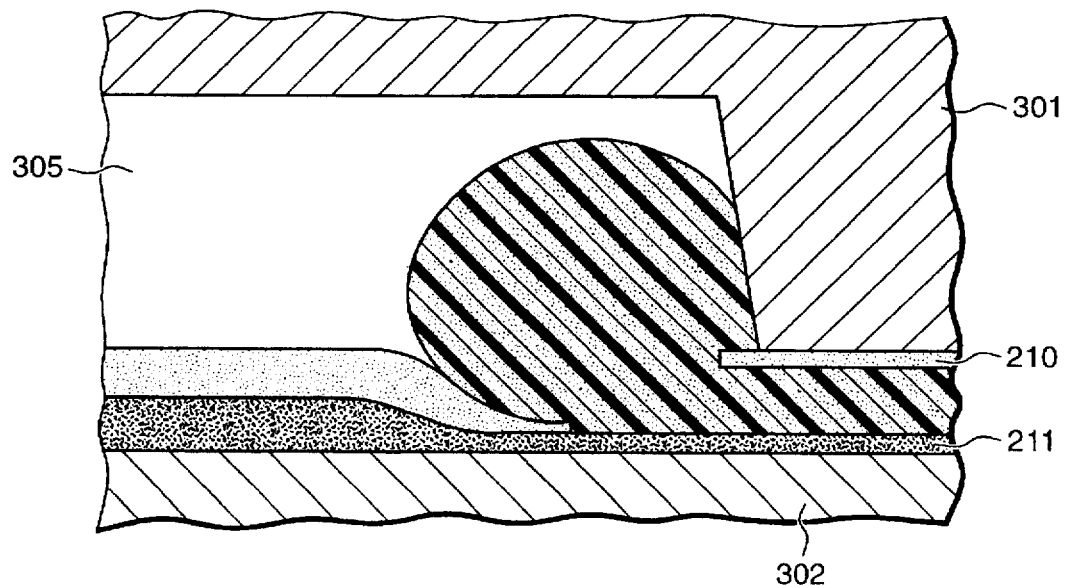
FIG. 18 is a cross-sectional view illustrating the molding condition of the damper of FIG. 16.

The resin injected into the mold space 304 as described above flows through the slits 215 to the side of the mold space 305. If the cross section of the resin flowing into the mold space 305 is larger for the cross-sectional area thereof in comparison with the mold space 304 for forming the damper body 200, the resin will excessively flow into the mold space 305. In other words, a larger volume of the resin will partly break through the seal material 210 and flow into the mold space 305 (FIG. 17) compared with the volume of the resin flowing into between the seal materials 210 and 211 (FIG. 18). As a result, the resin flowing into the mold space 305 will flow out onto the seal material 210, forming the overflow part 231.

The inventer et al recognized through examination that the occurrence of this overflow part 231 could be prevented by controlling the resin volume into the mold space 305.

Figure 19:
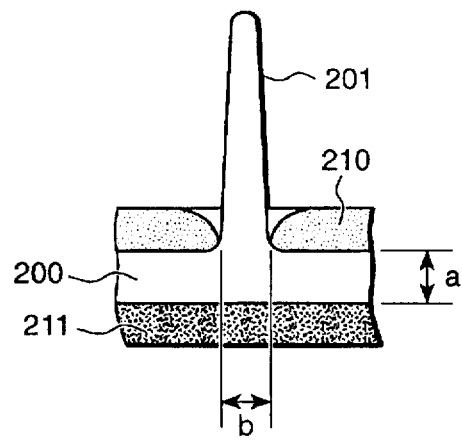
FIG. 19 is a cross-sectional view illustrating the thickness and shape of an air guide at the root part related to the present invention.

Accordingly, as illustrated in FIG. 19, the thickness (b) of the air guide 201 at the root part, which corresponds with the inlet of the mold space 305, should be set to be equal to or smaller than the thickness (a) of the damper body 200. According to the examination by the inventer et al, when the thickness (b) of the air guide 201 at the root part is set to be 80% or less of the thickness (a) of the damper body 200, the flow rate of the resin into the mold space 305 can be controlled, and the occurrence of the above overflow part 231 can be prevented. Specifically, when the thickness (a) of the damper body 200 is set to 3 mm and the thickness (b) of the air guide 201 at the root part is set to 1.5 to 2.5 mm, the occurrence of the above overflow part 231 can be prevented.

It should also be noted that, as the occurrence of the above overflow part 231 can be prevented by setting the thickness (b) of the air guide 201 at the root part is set to be 80% or less of the thickness (a) of the damper body 200, when only the overflow part 231 is considered, the smaller the thickness (b) of the air guide 201 at the root part is, the greater the percentage of the occurrence of the overflow part 231. However, if the thickness (b) of the air guide 201 at the root part is set to be excessively small, the strength of the air guide will be insufficient. For this reason, the thickness (b) of the air guide 201 at the root part should be determined by considering the strength of the air guide 201.

Figure 20:
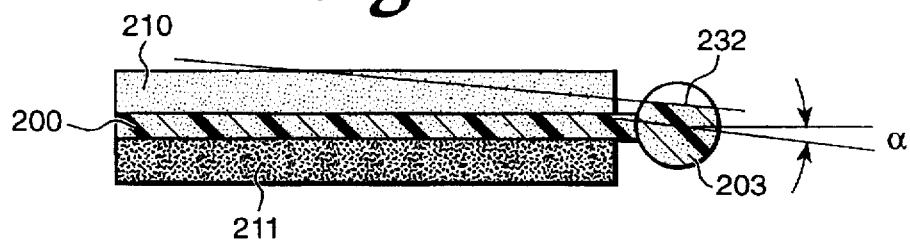
FIG. 20 is a cross-sectional view illustrating the discrepancy in angle between the flat part of the shaft part and the damper body.

Next, an embodiment related to the fourth aspect of the present invention will be described. According to the examination by the inventer et al, there are some cases where a flat part 232 formed on the surface of the shaft part 203 is not parallel with the damper body 200 as illustrated in FIG. 20. The damper body 200 is designed to rotate around the shaft part 203, and the position of this rotation is regulated by the flat part 232 formed on the surface of the shaft part 203. Accordingly, if there is an error in angle denoted by α between the flat part 232 of the shaft part 203 and the damper body 200 as illustrated in FIG. 20, the position of the damper body 200 will be displaced by this angle α, and the air flow can not be exactly switched.

Figure 21:
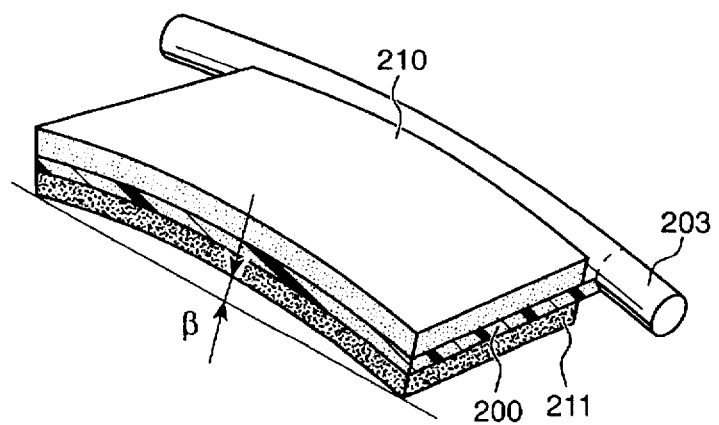
FIG. 21 is a perspective view illustrating a deformation example of the damper body caused by strain.

Also according to the examination by the inventer et al, there are some other cases where the damper body 200, which should be a completely flat plate, is warped as denoted by β in FIG. 21. The inventer et al examined for the causes of the problems as illustrated in FIGS. 20 and 21, and confirmed that these problems were caused by the restoring force of the seal material 211 that is exerted when the movable metal mold 301 was opened from the fixed metal mold 302. In the following passages, the results of the examination by the inventer et al will be described by referring to FIGS. 22 through 25 inclusive.

Figure 22:
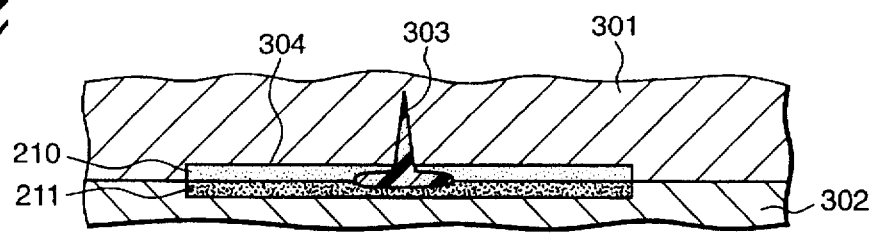
FIG. 22 is a cross-sectional view of the molding condition of the damper of FIG. 21.

As illustrated in FIG. 22, in mold injection process, the seal materials 210 and 211 are compressed by the movable metal mold 301 and the fixed metal mold 302, and held within the mold space 304 in the compressed state. The resin injected from the injection nozzle 303 diffuses within the mold space 304 between the seal materials 201 and 211.

Figure 23:
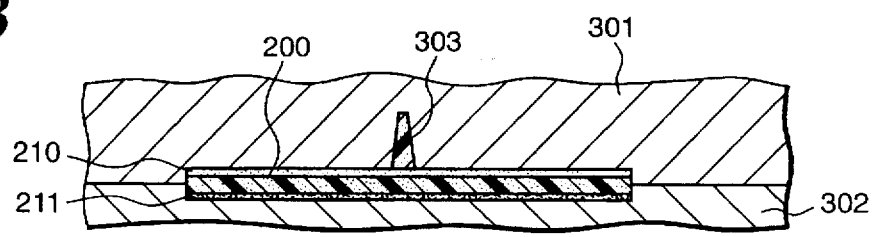
FIG. 23 is a cross-sectional view of the molding condition of the damper of FIG. 21.
Figure 24:
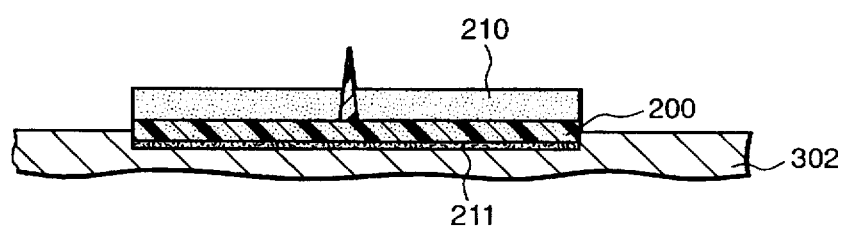
FIG. 24 is a cross-sectional view of the molding condition of the damper of FIG. 21.
Figure 25:
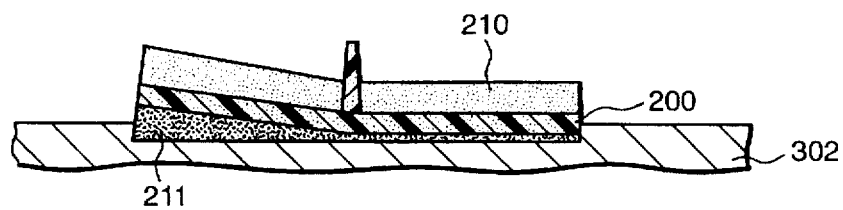
FIG. 25 is a cross-sectional view of the molding condition of the damper of FIG. 21.

As illustrated in FIG. 23, the resin fills the mold space 304 while further compressing the seal materials 210 and 211. When the injection is completed and the resin is cured, the movable metal mold 301 is opened from the fixed metal mold 302 as illustrated in FIG. 24. At this time, the damper body 200 is continuously held by the fixed metal mold 302 while still compressing the seal material 211. Then, the damper body 200 is removed from the fixed metal mold 302 by an ejector pin (not illustrated). At this time, if the entire damper body is not held by the fixed metal mold 302, the damper body 200 will partly be deformed as illustrated in FIG. 25.

Particularly, as the damper body 200 is held by the fixed metal mold 302 while compressing the seal material 211, the restoring force of the seal material 211 acts on the damper body 200 in the deforming direction. Therefore, if the damper body 200 has any part which is small in mold release resistance, the restoring force of the seal material 211 will overcome the compressing force of the damper body 200, and the damper body 200 will be deformed.

Figure 26:
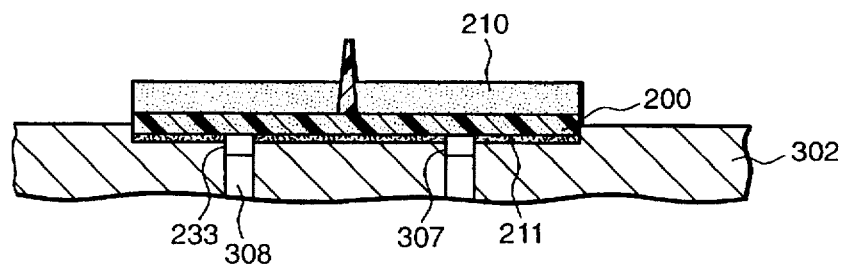
FIG. 26 is a cross-sectional view illustrating a mold provided with holding parts related to the present invention.

Accordingly, in the fourth embodiment of the present invention, as illustrated in FIG. 26, the fixed metal mold 302 is provided with cavities 307 to form holding parts 233 integrally with the damper body 200, the bottom of the cavities 307 being formed with the tip of the ejector pins 308.

In this arrangement, the resin flowed into the mold space 304 flows through the seal material 211 into the cavities 307 and form the holding parts 233. FIG. 26 illustrates the state with the movable metal mold 301 opened from the fixed metal mold 302 in the process corresponding with FIG. 24. As illustrated in FIG. 26, as the holding parts 233 are fit into the respective cavities 307 of the fixed metal mold 302 and held thereby, the entire damper body 200 can be completely held by the fixed metal mold 302. In other words, however strongly the restoring force of the seal material 211 acts on the damper body 200, since a holding force is acting between the holding parts 233 and the cavities 307 overcoming the restoring force of the seal material 211, even the partial displacement of the damper body 200 from the fixed metal mold 302 may not occur.

Figure 27:
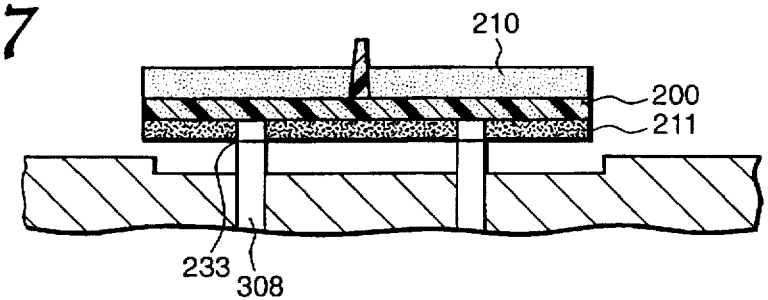
FIG. 27 is a cross-sectional view illustrating the ejector pin in operation for the metal mold of FIG. 26.

Then, as illustrated in FIG. 27, the ejector pins 308 move to eject the damper body 200 through the holding parts 203 from the fixed metal mold 302.

Figure 28:
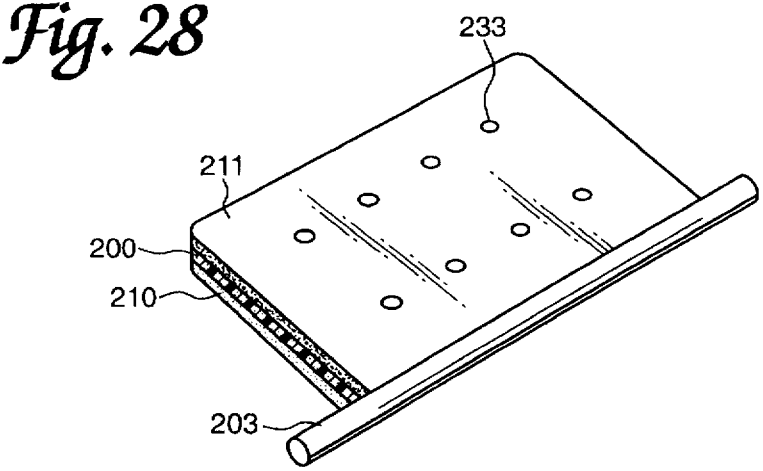
FIG. 28 is a cross-sectional view illustrating an embodiment of a damper formed by the metal mold of FIG. 26.

FIG. 28 is a perspective view illustrating a damper having the holding parts 233 viewed from the side of the seal material 211. As illustrated in this figure, the cross sections of the holding parts 233 are exposed from the seal material 211.

Here, as the thickness of the seal material 211 is 4.5 to 6 mm in the restituted state as illustrated in FIG. 28, the height of the holding parts 233 should preferably be 4.5 mm or less so that the holding parts 233 may not protrude from the front surface of the seal material 211.

The holding parts 233 should preferably be formed at positions where the mold release resistance of the damper body 200 is small. When the air flow switching doors 101 and 102 are flat as illustrated in FIG. 28, the holding parts 233 should preferably be dispersed over the entire damper body 200.

It should be noted, however, that the peripheral part of the damper body 200, which is designed to seal the air flow by contacting the opening of the case, should not be provided with the holding parts 233. Furthermore, as the seal material 211 may be deformed at around the holding parts 233 due to the effect of the holding parts 233, the holding parts 233 should not be disposed at the peripheral part of the damper body 200 to secure the air flow sealing as well as to prevent the deformation of the seal material 211.

Specifically, the deformation of the seal material 211 is allowed at around each holding part 233 for approximately 5 mm therefrom, and the seal width is requested to be at least approximately 10 mm to secure the function as the seal material 211. Therefore, each holding part 233 should be disposed inside from the peripheral part of the damper body 200 by at least 15 mm.

FIGS. 26 and 27 illustrate an embodiment in which the seal materials 210 and 211 are disposed at both sides of the damper body 200 respectively. However, it is only the seal material 211 disposed at the side of the fixed metal mold 302 that matters in the fourth aspect of the present invention, and therefore in this embodiment, the other seal material 210 is not always necessary.

Figure 29:
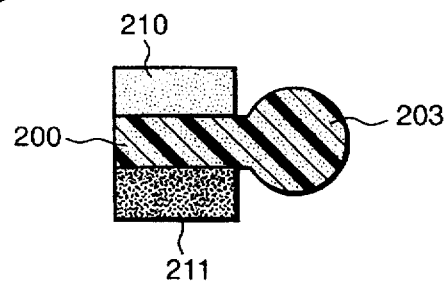
FIG. 29 is a cross-sectional view illustrating an adjacent area of the shaft part of the damper.

Description will now be given to an embodiment related to the fifth aspect of the present invention. When the seal materials 210 and 211 are extended up to the end surface of the damper body 200 at the side of the shaft part 203, the seal materials 210 and 211 should hold the prescribed seal material shape at the end surface at the side of the shaft part 203 as illustrated in FIG. 29.

Figure 30:
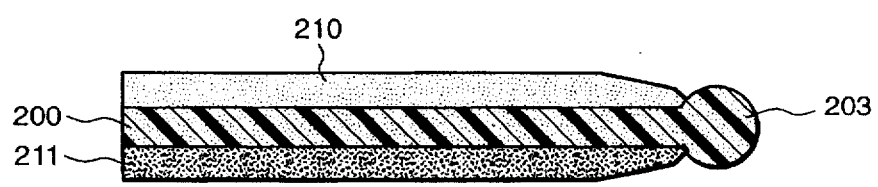
FIG. 30 is a cross-sectional view illustrating a damper whose seal materials are modified nearby the shaft part.

However, a defect was confirmed that, as illustrated in FIG. 30, the seal materials 210 and 211 adhered to the shaft part 203, and consequently the seal materials 210 and 211 thinned down at the side of the shaft part 203.

Figure 31:
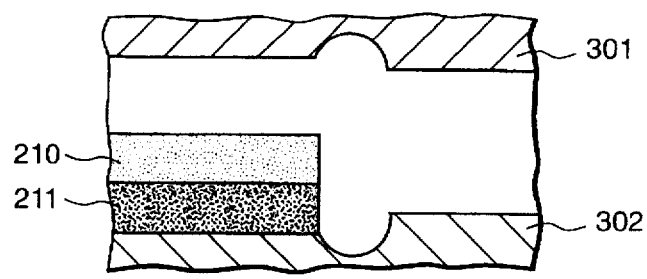
FIG. 31 is a cross-sectional view illustrating the molding condition of the damper of FIG. 30.
Figure 32:
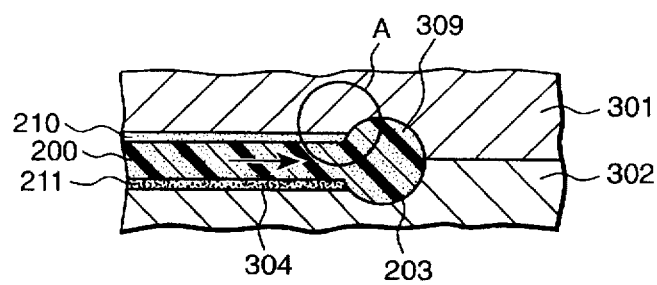
FIG. 32 is a cross-sectional view illustrating the molding condition of the damper of FIG. 30.

Then, in the following paragraphs, the results of the examination by the inventor et al will be described as to the cause of the thinning down of the seal materials 210 and 211 illustrated in FIG. 30. As illustrated in FIG. 31, the seal materials 210 and 211 are disposed within the mold space 304 beforehand. In this state, as illustrated in FIG. 32, the movable metal mold 301 is clamped on the fixed metal mold 302, and a mold space 309 for forming the shaft part 203 and the mold space 304 for forming the damper body 200 are formed. In this state, the resin is injected into the mold space 304 and the mold space 309, and at the same time, the seal materials 210 and 211 are further compressed as illustrated in FIG. 32.

Here, as indicated by an arrow in FIG. 32, the injected resin flows within the mold space 304 towards the shaft part 203. The seal materials 210 and 211 are drawn by this injected resin flow, and the end surfaces of the seal materials 210 and 211 may be deformed at the side of the shaft part 203.

Figure 33:
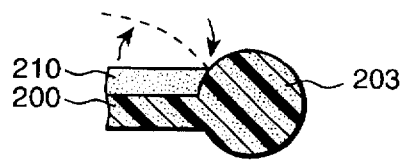
FIG. 33 is an enlarged cross-sectional view of part A FIG. 32.

FIG. 33 illustrates an enlargement of a part A of FIG. 32. As described above, the seal material 210 is drawn by the injected resin flow, and, as a result, the end surface of the seal material 210 may adhere to the shaft part 203.

Figure 34:
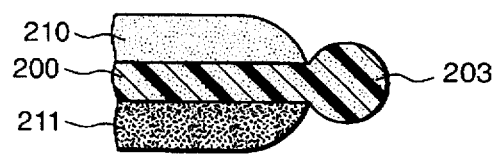
FIG. 34 is a cross-sectional view illustrating the molding condition of the damper of FIG. 30.

FIG. 34 illustrates the seal materials 210 and 211 restituted after the movable metal mold 301 is opened from the fixed metal mold 302. As illustrated in this figure, if the end surfaces of the seal materials 210 and 211 adhere to the shaft part 203, the seal materials 210 and 211 can not restitute at the adhered part, and, as a result, the seal materials 210 and 211 will thin down at the side of the shaft part 203.

Figure 35:
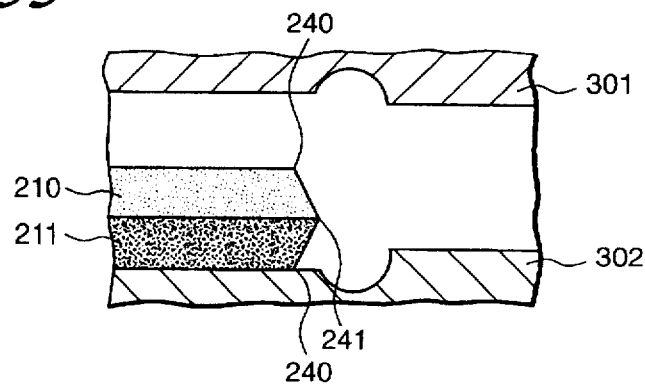
FIG. 35 is a cross-sectional view illustrating the molding condition of the damper related to the present invention.

To counter this problem, this embodiment tapers the seal materials 210 and 211 at the end surfaces at the side of the shaft part 203. This taper is so shaped, as illustrated in FIG. 35, that end surfaces 204 at which the seal materials 210 and 211 contact the fixed metal mold 302 are farther from the shaft part 203 compared with the other end surfaces thereof, 241.

Figure 36:
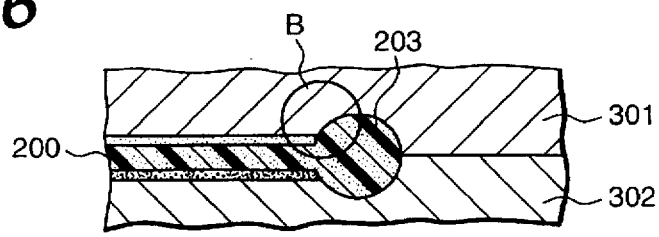
FIG. 36 is a cross-sectional view illustrating the molding condition of the damper related to the present invention.
Figure 37:
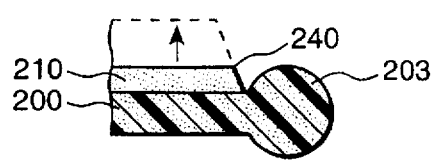
FIG. 37 is an enlarged cross-sectional view of part B of FIG. 36.

In this embodiment, due to this arrangement as illustrated in FIG. 36, when the resin is injected after mold clamping, the end surfaces 240 of the seal materials 210 and 211 do not contact the shaft part 203. FIG. 37 illustrates an enlargement of a part B of FIG. 36. It is clear from this figure, the tapered end surface 240 of the seal material 210 is left detached from the shaft part 203.

Figure 38:
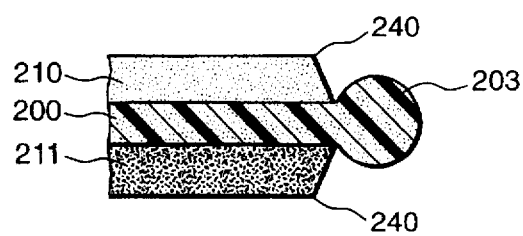
FIG. 38 is a cross-sectional view illustrating the molding condition of the damper related to the present invention.

FIG. 38 illustrates the state in which the seal materials 210 and 211 have restored from the state illustrated in FIG. 37.

As described in the above, as the end surfaces 240 of the seal materials 210 and 211, being detached from the shaft part 203, can completely restitute, and according to this embodiment, the seal materials 210 and 211 can almost uniformly hold the thickness thereof throughout the overall length thereof.

Figure 39:
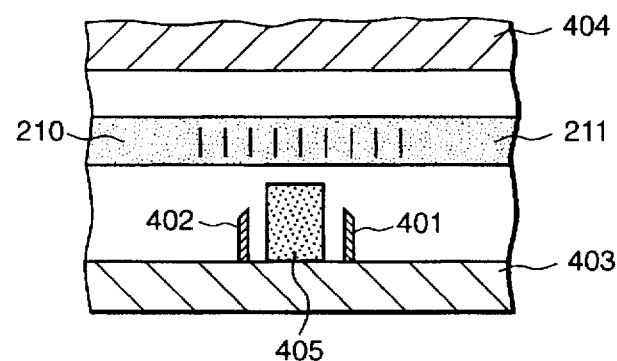
FIG. 39 is a cross-sectional view illustrating the composition of cutters for the seal materials of FIG. 35.
Figure 40:
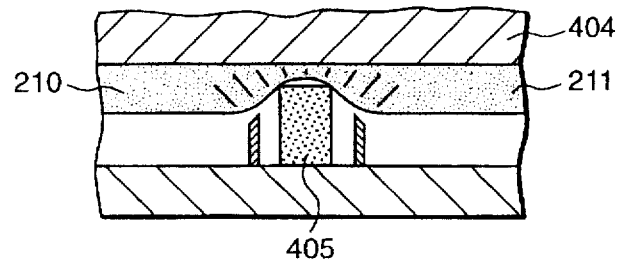
FIG. 40 is a cross-sectional view illustrating the composition of cutters for the seal material of FIG. 35.
Figure 41:
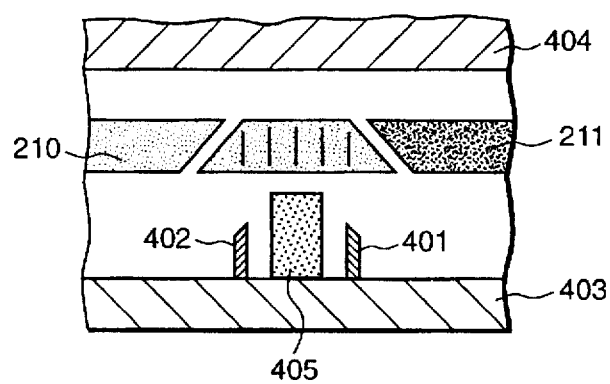
FIG. 41 is a cross-sectional view illustrating the composition of cutters for the seal material of FIG. 35.

For information, FIGS. 39, 40 and 41 illustrate a method of tapering the end surfaces of the seal materials 210 and 211. According to this method, the seal materials 210 and 211 are cut by cutters 401 and 402. The cutters 401 and 402 are held by a based 403, while the seal materials 210 and 211 are held between the base 403 and a contact material 404 facing the base 403.

Furthermore, as illustrated in FIG. 39, on the base 403 is disposed a seal material compressing material 405.

In this state, as illustrated in FIG. 40, when the contact material 404 is approached to the base 403, the seal materials 210 and 211 are compressed by the seal material compressing material 405. In this state, when the contact material 404 is contacted to the cutters 401 and 402, the seal materials 210 and 211 in the compressed state are cut by the cutters 401 and 402. As a result, as illustrated in FIG. 41, when the contact material 404 retracts and the seal materials 210 and 211 restitute, the cut end surfaces thereof are shaped tapered.

An embodiment related to the sixth aspect of the present invention will now be described.

Figure 42:
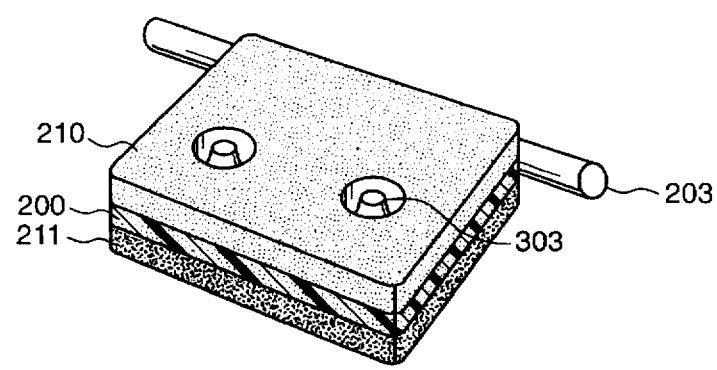
FIG. 42 is a perspective view illustrating a damper molded by a metal mold provided with an injection nozzle related to the present invention.

This embodiment is characterized by the shape of the injection nozzles 303 which stand cutting through the seal material 210 for injecting the resin into the mold space 304. As illustrated in FIG. 42, the injection nozzles 303 stand cutting through the seal material 210.

Figure 43:
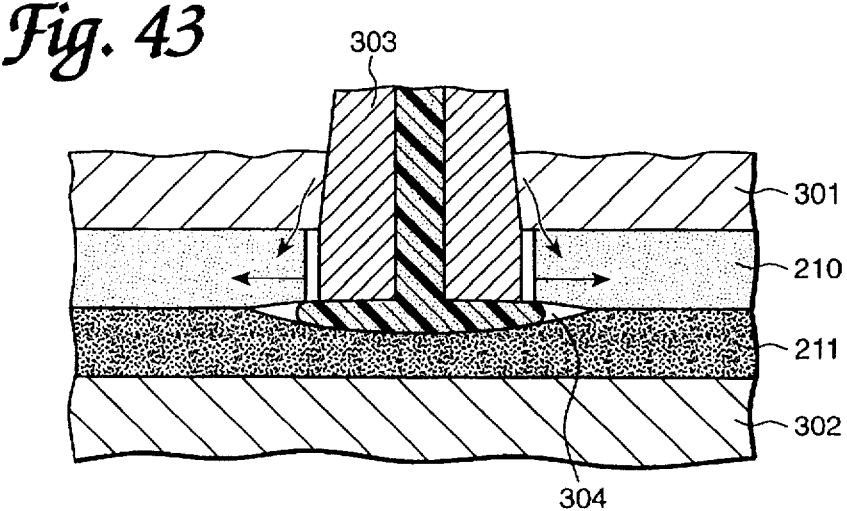
FIG. 43 is a cross-sectional view illustrating a defect example of fluid condition of the resin nearby the injection nozzle.
Figure 44:
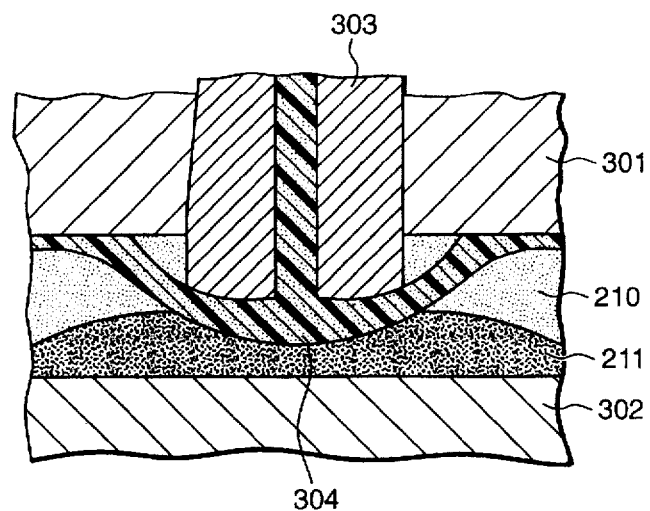
FIG. 44 is a cross-sectional view illustrating a defect example of fluid condition of the resin nearby the injection nozzle.

Here, if the injection nozzle 303 are not proper in shape, the resin will not properly flow into between the seal materials 210 and 211, and, as a result, as illustrated in FIG. 43, the seal material 210 may be displaced in a direction perpendicular to a direction of compression of seal materials 210 and 211, or, as illustrated in FIG. 44, the resin may flow between the seal material 210 and the metal mold 301.

In order to prevent the above problems, the inventor et al repeatedly examined for the shape of the injection port 303 which enabled the resin flowed from the injection nozzle 303 into the mold space 304 to exactly flow into between the seal materials 210 and 211.

Figure 45:
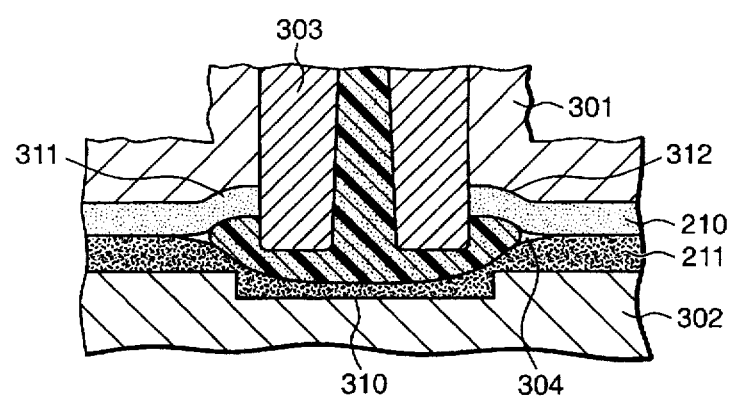
FIG. 45 is a cross-sectional view illustrating a part nearby the injection nozzle of the metal mold of FIG. 45.

FIG. 45 illustrates an embodiment related to the sixth aspect of the present invention, in which the fixed metal mold 302 is provided with a recessed part 310 at a position exactly facing the injection nozzle 303 to reverse the flow of the resin injected from the injection nozzle 303.

On the other hand, the movable metal mold 301 is provided with a recessed part 311 in the periphery of the injection nozzle 303 to reduce the compression density of the seal material 210 and facilitate the resin flow in the direction that the seal material 210 delaminates from the seal material 211. Particularly, the outer periphery of the recessed part 311 formed in the movable metal mold 301 constitutes a tapered part 312.

According to this embodiment, therefore, the resin injected from the injection nozzle 303 into the mold space 304 flows to the side of the recessed part 310 of the fixed metal mold 302, and reverses the flow in the recessed part 310. The reversed resin flow proceeds into between the seal materials 210 and 211, thrusting up the seal material 210 towards the recessed part 311 of the movable metal mold 301. Particularly, as the recessed part 311 of the movable metal mold 301 is provided with the tapered part 312, the seal material 210 is pressed at almost right angles against the tapered part 312.

Due to the above arrangement, the displacement of the seal material 210 in a direction perpendicular to a direction of compression of seal material 210 by the resin flow is prevented, and the end surface position of the seal material 211 can exactly be maintained.

Figure 46:
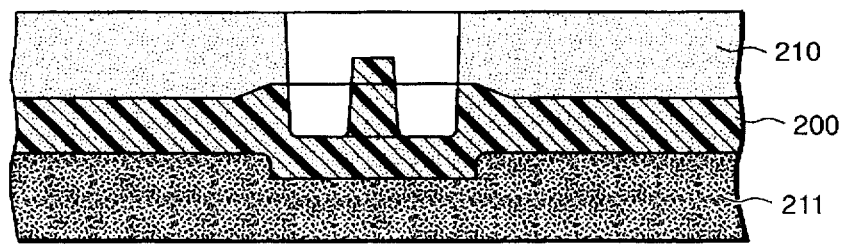
FIG. 46 is a cross-sectional view illustrating a part of a damper formed by the metal mold of FIG. 45.

FIG. 46 illustrates the shape of the damper body 200 formed by the movable metal mold 301 and the fixed metal mold 302. As illustrated in FIG. 46, the positions of the seal materials 210 and 211 which have restored from the compressed state have been exactly be maintained.

The seal materials 210 and 211 are disposed over both the sides of the damper body 200 respectively in the embodiment illustrated in FIGS. 45 and 46. The present invention, however, can also be applied to an embodiment in which the seal material 210 is disposed only over one side of the damper body 200 as illustrated in FIGS. 47 and 48.

Figure 47:
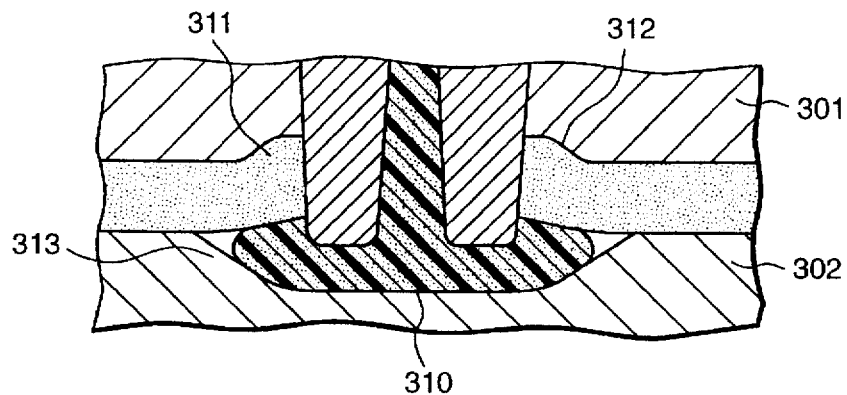
FIG. 47 is a cross-sectional view illustrating a part nearby the injection nozzle of a metal mold related to the present invention.

In the embodiment illustrated in FIG. 47, a tapered part 313 is formed also around the recessed part 310 of the fixed metal mold 302 so that the resin injected from the injection nozzle 303 can smoothly reverse the flow direction.

Figure 48:
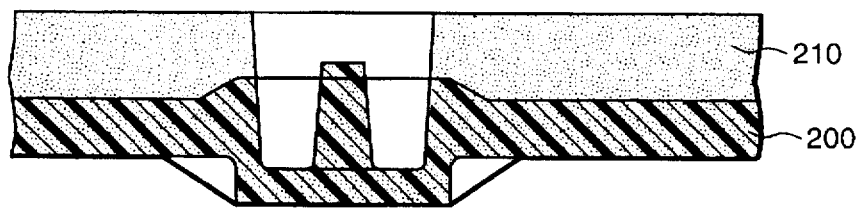
FIG. 48 is a cross-sectional view illustrating a part of a damper formed by the metal mold of FIG. 47.
Figure 49:
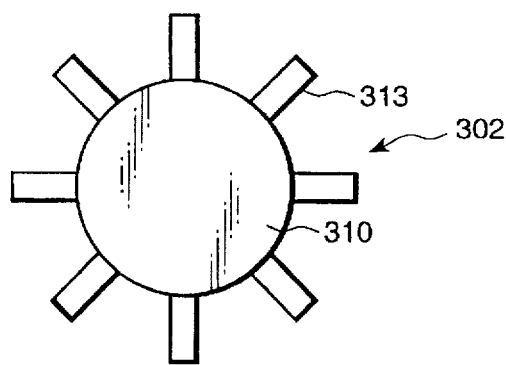
FIG. 49 is a front view illustrating the shape of a part nearby a recessed part of the metal mold of FIG. 47.

FIG. 48 illustrates the damper body 200 and the seal material 210 in the state after the movable metal mold 301 is opened from the fixed metal mold 302. FIG. 49 is a front view illustrating the recessed part 310 of the fixed metal mold 302. As illustrated in FIG. 49, the tapered part 313 may not be formed throughout the recessed part 310 but formed at eight portions which are equally separated from each other by 45°.

Figure 50:
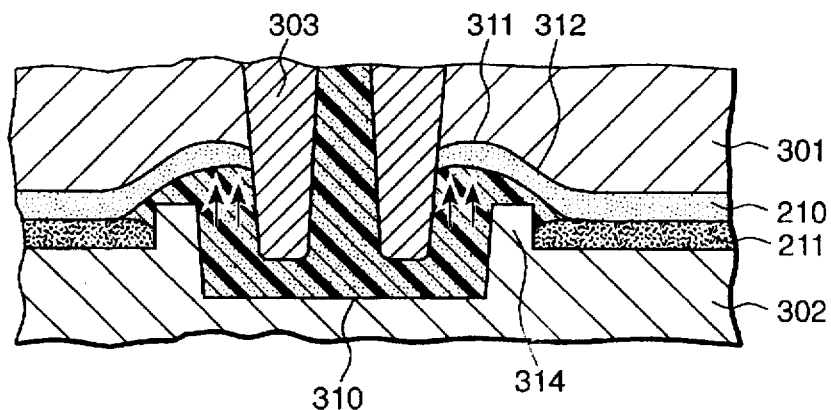
FIG. 50 is a cross-sectional view illustrating a part nearby the injection nozzle of a metal mold related to the present invention.
Figure 51:
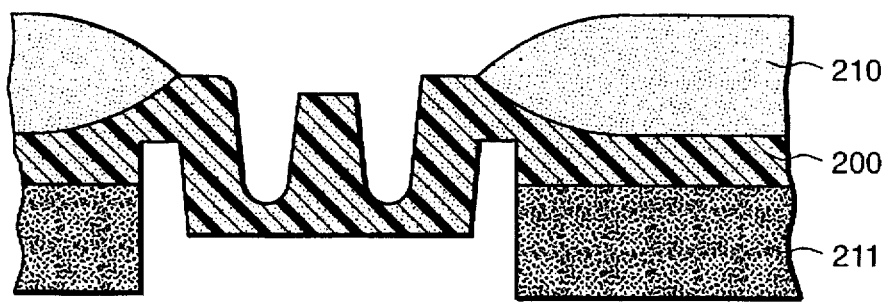
FIG. 51 is a cross-sectional view illustrating a part of a damper formed by the metal mold of FIG. 50.

FIGS. 50 and 51 illustrate another embodiment of the sixth invention of the present invention. In this embodiment, the seal material 211 disposed at the side of the fixed metal mold 302 is void at the portion exactly facing the injection nozzle 303.

As illustrated in FIG. 50, a projection 314 is annularly formed around the recessed part 310 of the fixed metal mold 302 to reverse the injected resin flow. Accordingly, the resin injected from the injection nozzle 303 into the recessed part 310 of the fixed metal mold 302 is reversed by the recessed part 310, and then guided by the projection 314 to the side of the recessed part 311 of the movable metal mold 301. This reversed resin flow presses the seal material 210 against the tapered part 312 of the movable metal mold 301, exactly holding the position of the seal material 210 as the embodiment illustrated in FIG. 45 does.

Particularly, in the embodiment illustrated in FIG. 50, the injected resin flow can be reversed again by the tapered part 312 of the movable metal mold 301 and the annular projection 314 of the fixed metal mold 302. That is, the resin bumped against the tapered part 312 of the movable metal mold 301 and reversed therein reverses again when flowing over the annular projection 314 and bumps against the end part of the seal material 211 disposed on the fixed metal mold 302. As a result, the resin reversed twice flows towards the seal material 211 at almost right angles, and the seal material 211 can exactly be held around the annular projection 314.

FIG. 51 illustrates a part of the damper body 200 formed by the metal molds 301 and 302 illustrated in FIG. 50. As illustrated in FIG. 51, both the seal materials 210 and 211 are exactly held in the prescribed positions.

Next, an embodiment related to the seventh aspect of the present invention will be described.

The examination by the inventer et al has revealed that, for some types of materials used for the seal materials 210 and 211, defects might be caused to the lamination parts between the seal materials 210 and 211 and the damper body 200.

Figure 52:
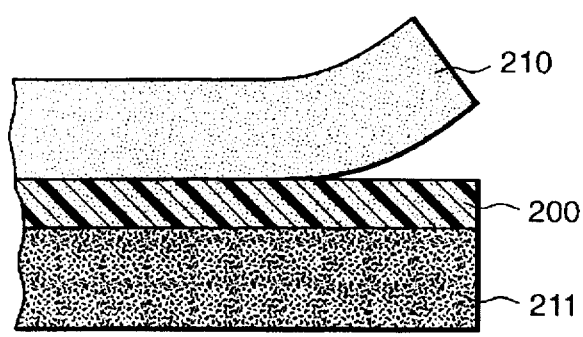
FIG. 52 is a cross-sectional view illustrating a defect molding condition of the seal materials.
Figure 53:
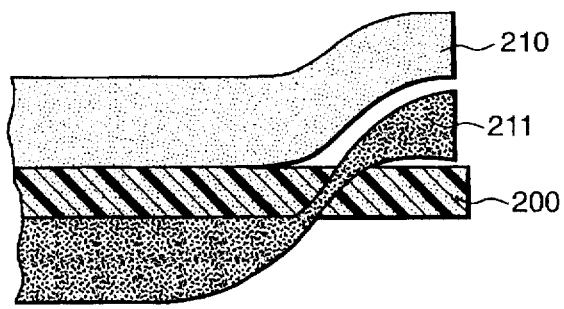
FIG. 53 is a cross-sectional view illustrating another defective molding condition of the seal materials.
Figure 54:
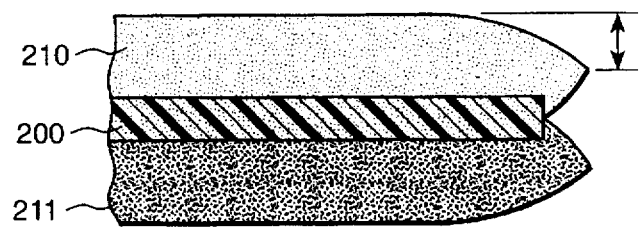
FIG. 54 is a cross-sectional view illustrating another defective molding condition of the seal materials.
Figure 55:
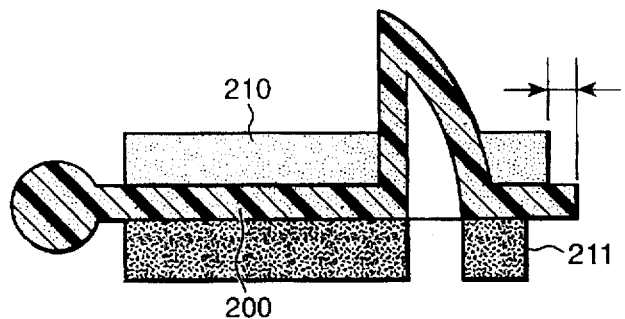
FIG. 55 is a cross-sectional view illustrating another defective molding condition of the seal materials.

FIGS. 52, 53 and 54 illustrate examples of such defects. In FIG. 52, due to insufficient joining power between the seal material 210 and the damper body 200, delamination is caused to between the seal material 210 and the damper body 200.

In FIG. 53, the resin flows through the seal material 211, displacing the damper body 200 at the outside of the seal material 211.

Due to the above arrangement, the displacement of the seal material 210 by the resin flow is prevented, and the end surface position of the seal material 211 can exactly be maintained.

FIG. 46 illustrates the shape of the damper body 200 formed by the movable metal mold 301 and the fixed metal mold 302. As illustrated in FIG. 46, the positions of the seal materials 210 and 211 which have restored from the compressed state have been exactly be maintained.

The seal materials 210 and 211 are disposed over both the sides of the damper body 200 respectively in the embodiment illustrated in FIGS. 45 and 46. The present invention, however, can also be applied to an embodiment in which the seal material 210 is disposed only over one side of the damper body 200 as illustrated in FIGS. 47 and 48.

In the embodiment illustrated in FIG. 47, a tapered part 313 is formed also around the recessed part 310 of the fixed metal mold 302 so that the resin injected from the injection nozzle 303 can smoothly reverse the flow direction.

FIG. 48 illustrates the damper body 200 and the seal material 210 in the state after the movable metal mold 301 is opened from the fixed metal mold 302. FIG. 49 is a front view illustrating the recessed part 310 of the fixed metal mold 302. As illustrated in FIG. 49, the tapered part 313 may not be formed throughout the recessed part 310 but formed at eight portions which are equally separated from each other by 45°.

FIGS. 50 and 51 illustrate another embodiment of the sixth invention of the present invention. In this embodiment, the seal material 211 disposed at the side of the fixed metal mold 302 is void at the portion exactly facing the injection nozzle 303.

As illustrated in FIG. 50, a projection 314 is annularly formed around the recessed part 310 of the fixed metal mold 302 to reverse the injected resin flow. Accordingly, the resin injected from the injection nozzle 303 into the recessed part 310 of the fixed metal mold 302 is reversed by the recessed part 310, and then guided by the projection 314 to the side of the recessed part 311 of the movable metal mold 301. This reversed resin flow presses the seal material 210 against the tapered part 312 of the movable metal mold 301, exactly holding the position of the seal material 210 as the embodiment illustrated in FIG. 45 does.

Particularly, in the embodiment illustrated in FIG. 50, the injected resin flow can be reversed again by the tapered part 312 of the movable metal mold 301 and the annular projection 314 of the fixed metal mold 302. That is, the resin bumped against the tapered part 312 of the movable metal mold 301 and reversed therein reverses again when flowing over the annular projection 314 and bumps against the end part of the seal material 211 disposed on the fixed metal mold 302. As a result, the resin reversed twice flows towards the seal material 211 at almost right angles, and the seal material 211 can exactly be held around the annular projection 314.

FIG. 51 illustrates a part of the damper body 200 formed by the metal molds 301 and 302 illustrated in FIG. 50. As illustrated in FIG. 51, both the seal materials 210 and 211 are exactly held in the prescribed positions.

Next, an embodiment related to the seventh invention of the present aspect will be described.

The examination by the inventer et al has revealed that, for some types of materials used for the seal materials 210 and 211, defects might be caused to the lamination parts between the seal materials 210 and 211 and the damper body 200.

FIGS. 52, 53 and 54 illustrate examples of such defects. In FIG. 52, due to insufficient joining power between the seal material 210 and the damper body 200, delamination is caused to between the seal material 210 and the damper body 200.

In FIG. 53, the resin flows through the seal material 211, displacing the damper body 200 at the outside of the seal material 211.

In FIG. 54, the seal materials 210 and 211 are drawn by the flow resistance of the resin when the resin is being injected, and the end surfaces of these seal materials 210 and 211 are not formed at right angles.

The inventor et al examined for the cause of these defects and found that these defects were related to the hardness of the foaming resin composing the seal materials 210 and 211, the size of the hollow parts (cells) of foaming resin, the tensile strength of the foaming resin, and the tearing strength of the foaming resin.

Specifically, if the hardness of the seal materials 210 and 211 is excessively low, the seal materials 210 and 211 will be excessively compressed during injection molding, and therefore the resin can not impregnated into the cells of the foaming resin.

Contrary to the above, if the hardness of the seal materials 210 and 211 is excessively high, the cells of the foaming resin will not be deformed during the injection molding, and consequently the good joint between the seal materials 210 and 211 and the damper body 200 can be achieved.

If the size of the cells of the foaming resin is excessively small, the resin will not sufficiently flow into the cells during the injection molding, and, as a result, sufficient joint between the seal materials 210 and 211 and the damper body 200 can not be achieved.

On the other hand, if the size of the cells of the foaming resin is excessively large, the resin will easily flow through the cells of the resin. As a result, the resin forming the damper body 200 will flow through the seal material 210 or 211. The defect example illustrated in FIG. 53 is caused when the size of the cells of the foaming resin used for the seal material 211 is excessively large.

If the tensile strength of the foaming resin is excessively high, when the foaming resin is drawn within the mold space by the flow resistance during the injection molding, the restoring force of the seal materials 210 and 211 is strong. For this reason, after the movable metal mold 301 is opened from the fixed metal mold 302, the seal materials 210 and 211 restitute and displaced to the side in opposition to the resin flow due to the strong restoring force. The resin composing the damper body 200 flows towards the end surface of the damper body 200 during the injection molding. When the seal materials 210 and 211 displace in the direction against the resin flow, the delamination may be caused to the end surface of the damper body 200 as illustrated in FIG. 52. Even if the delamination is not caused, the end surfaces of the seal materials 210 and 211 may thicken.

If a foaming resin with low tensile strength is used to increase the elongation of the seal materials 210 and 211 during the injection molding, similar defects will occur. The seal materials 210 and 211 will be compressed against the end surface side thereof due to the flow resistance of the resin during the injection molding. That is, when the injection molding is completed, the seal materials 210 and 211 will have high density at the end surfaces thereof. As a result, when the movable metal mold 301 is opened from the fixed metal mold 302, the end surfaces of the seal materials 210 and 211 will slackly deform as illustrated in FIG. 54.

If a foaming resin with low tearing strength is used, the seal materials 210 and 211 will be torn apart from each other due to the resin pressure generated during the injection molding.

As evident from the above description, for some types of foaming resins composing the seal materials 210 and 211, good joint between the seal materials 210 and 211 and the damper body 200 may not be achieved by merely setting the seal materials 210 and 211 within the metal molds 301 and 302 and injecting the resin thereinto.

In order to prevent molding defects caused by the quality of the seal materials 210 and 211, a filmy foaming material is laminated beforehand to the surfaces of the foaming resin composing the seal materials 210 and 211 according to the seventh invention of the present invention.

Figure 56:
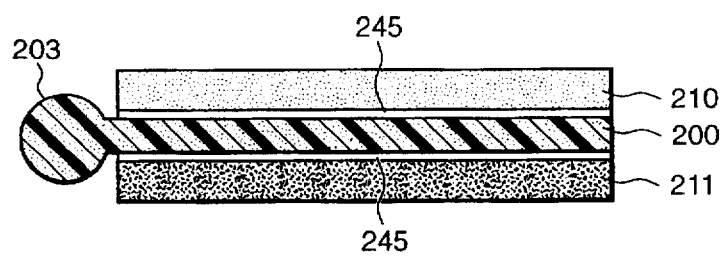
FIG. 56 is a cross-sectional view illustrating a damper composed of a filmy foaming elastic material related to the present invention.

FIG. 56 illustrates another embodiment related to the seventh aspect of the invention, in which an unwoven fabric 245 of approximately 52 μm thick is used as a filmy foaming material. This unwoven fabric 245 is a mixture of polyester family fiber and vegetable fiber. The unwoven fabric 245 is coated beforehand with hotmelt as an adhesive, and laminated to the seal materials 210 and 211 at the surfaces which are to be laminated to the damper body 200, and then heated to melt the adhesive, whereby the unwoven fabric 245 and the seam materials 210 and 211 are integrally glued together.

In this state, as illustrated in FIG. 3, the seal materials 210 and 211 are set within the movable metal mold 301 and fixed metal mold 302 respectively, and then the rein is injected into the mold space 304. The injected resin forms the damper body 200 between the unwoven fabric 245 at the side of the seal material 210 and the unwoven fabric 245 at the side of the seal material 211.

As the injected resin is impregnated into the unwoven fabrics 245, the damper body 200 is joined to the unwoven fabrics 245 during the injection molding. On the other hand, as the injected resin does not flow through the unwoven fabric 245, the injected resin does not flow directly to the sides of the seal materials 210 and 211.

As a result, the defects caused by the resin during the injection molding as illustrated in FIGS. 50 through 55 inclusive can be prevented.

In an incidental way, in the embodiment illustrated in FIG. 56, both the seal materials 210 and 211 positioned over the front and rear surfaces of the damper body 200 respectively are laminated with the unwoven fabric 245. If the seal materials 210 and 211 are different from each other in material quality, it will be sufficient that the unwoven fabric 245 is laminated only to the seal material either 210 or 211 whichever the molding defects may be caused to during the injection molding.

What is claimed is:

1. A method for producing a damper which comprises a damper body for controlling air flow, and foam resin seal materials attached to surfaces of said damper body for sealing said damper body, the method comprising:

disposing said seal materials within metal molds, wherein at least one of said molds has a recessed part formed within said at least one mold nearby an injection nozzle;

compressing said seal materials by clamping said molds together;

forming said damper body within a mold space formed by clamping said metal molds, then injecting a resin with said injection nozzle into the mold space through a passage defined through said seal materials, and at the same time joining said damper body and said seal materials by partly impregnating the resin into cells of said seal material; and arranging a flow of the resin injected from said injection nozzle into said mold space so as not to be parallel to a portion of said seal material nearby said injection nozzle and then reversing the flow of resin injected into said mold space through the passage defined through said seal materials within said mold space whereby resin flows towards said recessed part so that said seal materials are prevented from being displaced in a direction perpendicular to a direction of compressing of said seal materials and resin is prevented from flowing between a seal material and a metal mold.

2. The method for producing a damper according to claim 1, wherein an outer periphery of said recessed part within said mold is tapered and the resin injected from said injection nozzle into the mold space and then reversed is pressed against the tapered part.

3. A method for producing a damper which comprises a damper body for controlling air flow, and foam resin seal materials attached to surfaces of said damper body for sealing said damper body, the method comprising:

disposing said seal materials within metal molds, wherein an injection nozzle for said metal molds is projectingly formed within a mold space between said molds and a recessed portion facing said injection nozzle within one of said metal molds is formed in the direction opposite said injection nozzle;

compressing said seal materials by clamping said molds together;

forming said damper body within said mold space formed by clamping said metal molds, then injecting a resin with said injection nozzle into the mold space through a passage defined through said seal materials, and at the same time joining said damper body and said seal materials by partly impregnating the resin into cells of said seal material; and arranging a flow of resin within said mold space so as not to be parallel to a portion of said seal material nearby said injection nozzle by reversing the flow of resin injected into said mold space through the passage defined by said recess through said seal materials within said mold space such that said seal materials are prevented from being displaced in a direction perpendicular to a direction of compressing of said seal materials and resin is prevented from flowing between a seal material and a metal mold.

4. A method for producing a damper which comprises a damper body for controlling air flow, and foam resin seal materials attached to surfaces of said damper body for sealing said damper body, the method comprising:

providing a recess in one of a pair of metal molds at a position facing said injection nozzle;

disposing said seal materials within metal molds;

compressing said seal materials by clamping said molds together;

forming said damper body within a mold space formed by clamping said metal molds, then injecting a resin with an injection nozzle into the mold space through a passage defined through said seal materials, and at the same time joining said damper body and said seal materials by partly impregnating the resin into cells of said seal material; and arranging said flow of resin within said mold space so as not to be parallel to a portion of said seal material nearby said injection nozzle by reversing the flow of resin injected into said mold space through the passage defined by said recess through said seal materials within said mold space such that said seal materials are prevented from being displaced in a direction perpendicular to a direction of compressing of said seal materials and resin is prevented from flowing between a seal material and a metal mold.

* * * * *